(12) United States Patent
Bovino et al.

(10) Patent No.: US 8,520,278 B2
(45) Date of Patent: Aug. 27, 2013

(54) OPTICAL LOGIC GATE

(75) Inventors: Fabio Antonio Bovino, Genoa (IT);
Maurizio Giardina, Genoa (IT); Maria Cristina Larciprete, Rome (IT); Marco Centini, Guidonia Montecelio (IT); Alessandro Belardini, Rome (IT); Concita Sibilia, Rome (IT); Mario Bertolotti, Rome (IT); Adriana Passaseo, Lecce (IT); Vittorianna Tasco, Lecce (IT); Roberto Cingolani, Arnesano (IT)

(73) Assignee: Selex Sistemi Integrati S.p.A., Roma (IT)

( * ) Notice: Subject to any disclaimer, the term of this patent is extended or adjusted under 35 U.S.C. 154(b) by 144 days.

(21) Appl. No.: 13/131,025

(22) PCT Filed: Nov. 24, 2008

(86) PCT No.: PCT/IT2008/000724
§ 371 (c)(1),
(2), (4) Date: Oct. 14, 2011

(87) PCT Pub. No.: WO2010/058432
PCT Pub. Date: May 27, 2010

(65) Prior Publication Data
US 2012/0033278 A1 Feb. 9, 2012

(51) Int. Cl.
*G02F 3/00* (2006.01)
(52) U.S. Cl.
USPC ............................................. 359/108
(58) Field of Classification Search
USPC ............... 359/107–108; 398/65; 385/14; 977/932, 940
See application file for complete search history.

(56) References Cited

U.S. PATENT DOCUMENTS 5,557,699 A * 9/1996 Kester et al. ............... 385/122
2009/0154887 A1* 6/2009 Covey ........................ 359/108

OTHER PUBLICATIONS

"All-optical transistor action by polarization rotation during type-II phase matched second harmonic generation," by L. Lefort and A. Barthelemy, Electronics Letters vol. 31, No. 11, May 25, 1995.*
International Search Report for Application No. PCT/IT2008/000724 dated Aug. 3, 2009.
Cao, H., et al., "Second harmonic generation in laser ablated zinc oxide thin films," *Applied Physics Letters, AIP, American Institute of Physics*, Melville, NY, US, vol. 73, No. 5, Aug. 3, 1998, pp. 572-574.
Larciprete, M. C., et al, "Characterization of second and third order optical nonlinearities of ZnO sputtered films," *Applied Physics B; Lasers and Optics*, Springer, Berlin, DE, vol. 82, No. 3, Mar. 1, 2006, pp. 431-437.

(Continued)

*Primary Examiner* — Stephone B. Allen
*Assistant Examiner* — Jeffrey Madonna
(74) *Attorney, Agent, or Firm* — Marshall, Gerstein & Borun LLP (57) ABSTRACT

Optical logic gate having a second-harmonic generator element that receives a first and a second optical input signal respectively having a first and a second angular frequency and respectively having a first and a second polarization, and which provides a second-harmonic optical signal having a third angular frequency and a third polarization. The third angular frequency is equal to the sum of the first and the second angular frequency. The third polarization is a function of the first and the second polarization. The second-harmonic generator element includes a second-harmonic generator layer in a material having a non-null second-order optical tensor.

17 Claims, 3 Drawing Sheets

(56) References Cited

OTHER PUBLICATIONS

Larciprete, M., et al, "Second harmonic generation in GaN/Al50Ga50N films deposited by metal-organic chemical vapor deposition," *Applied Physics Letters, AIP, American Institute of Physics*, Melville, NY, US, vol. 89, No. 13, Sep. 26, 2006.

Passeri, D., et al., "Second harmonic generation in AlGaN, GaN and AlxGa1-xN/GaN multiple quantum well structures," *Applied Physics B (Lasers and Optics)*, Springer-Verlag Germany, vol. B79, No. 5, Sep. 2004, pp. 611-615.

Biader, Ceipidor L., et al., "Logic Functions, Devices, and Circuits Based on Parmetric Nonlinear Processes," *Journal of Lightwave Technology*, IEEE Service Center, New York, NY, US, vol. 26, No. 3, Feb. 1, 2008, pp. 373-378.

Faccio, D., et al., "Noncollinear Maker's fringe measurements of second-order nonlinear optical layers," *Optics Letters Opt. Soc.*, America USA, vol. 25, No. 18, pagse 1376-1378.

\* cited by examiner

OPTICAL LOGIC GATE

CROSS-REFERENCE TO RELATED APPLICATIONS

This is the U.S. national phase application of International Application No. PCT/IT2008/000724, filed Nov. 24, 2008.

TECHNICAL FIELD

The present invention concerns an optical logic gate. In particular, the present invention concerns an optical logic gate of the "exclusive-OR" (EXOR) or "exclusive-NOR" (EX-NOR) type.

BACKGROUND ART

As is known, electronic circuits that implement logical (Boolean) operations, i.e. operations involving logic states, have been available for a long time, these electronic circuits being known as logic gates. The NOT, AND, OR, XOR, NOR, NAND and XNOR operations are some of the logic operations performed by the more common logic gates.

A logic gate comprises one or more inputs able to receive respective electrical input signals, and one or more electrical outputs able to provide respective electrical output signals. Both the electrical input signals and the electrical output signals are typically digital signals, i.e. signals with electrical characteristics (voltage, for example) that can only assume two values over time, respectively indicating a first and a second logic state, in turn logically represented by bit "0" and bit "1". Changes in the logic states correspond to rising or descending fronts of the corresponding electrical characteristics. In the following, for brevity, reference is simply made to electrical signals indicative of the logic states, implying reference to the values taken by the corresponding electrical characteristics of these electrical signals when indicative of these logic states.

Operationally, given a logic gate that implements a particular logic operation and given certain electrical input signals, or rather given certain logic states present at the electrical inputs of the logic gate, the logic gate provides one or more electrical output signals indicative of the corresponding output logic states such that the input logic states and the output logic states respect a truth table corresponding to the particular logic operation implemented by the logic gate. For example, in the particular case of an EXOR logic gate having two inputs and one output, the output logic state assumes the value "0" when the input logic states are the same ("00" or "11") and assumes the value "1" when the input logic states are different. Vice versa, in the particular case of an EXNOR logic gate, the output logic state assumes the value "1" when the input logic states are the same ("00" or "11"), and assumes the value "0" when the input logic states are different.

At the logical level, the behaviour of a logic gate is exhaustively described by the corresponding truth table.

At the electrical level, the description of the logic gates becomes complicated, as each logic gate, which is physically embodied by means of an electronic circuit, introduces propagation delays and reacts to changes in the logic state at its inputs in a non-ideal manner. In particular, given a time instant t0 in which a rising or descending front of an electrical input signal occurs, the logic gate changes (if necessary) the logic state on its output (or outputs) with a certain delay with respect to time instant t0. In addition, the fronts of the electrical signals are never ideal, i.e. they do not provide instantaneous switching of the electrical characteristic from the first to the second value, but rather exhibit a transition period in which the electrical characteristic assumes intermediate values and in which the behaviour of the logic gate is undetermined. Lastly, electrical signals are inevitably affected by noise, with consequent performance degradation of the logic gate.

Despite the above-described drawbacks, electrical logic gates have turned out to be of decisive importance in the development of digital electronics; however, an increasing need is felt for logic gates of a different type, ideally unaffected by the drawbacks that characterize electrical logic gates, and consequently characterized, for example, by minimal switching times, absence of noise and reduced consumption.

DISCLOSURE OF INVENTION

The object of the present invention is to provide an optical logic gate that allows the above-indicated drawbacks of known art to be at least partially overcome.

According to the present invention, an optical logic gate and a method for implementing this optical logic gate are provided as respectively described in claims 1 to 15.

BRIEF DESCRIPTION OF THE DRAWINGS

For a better understanding of the invention, a preferred embodiment shall now be described, purely by way of a non-limitative example and with reference to the enclosed figures, where.

BEST MODE FOR CARRYING OUT THE INVENTION

Figure 1:
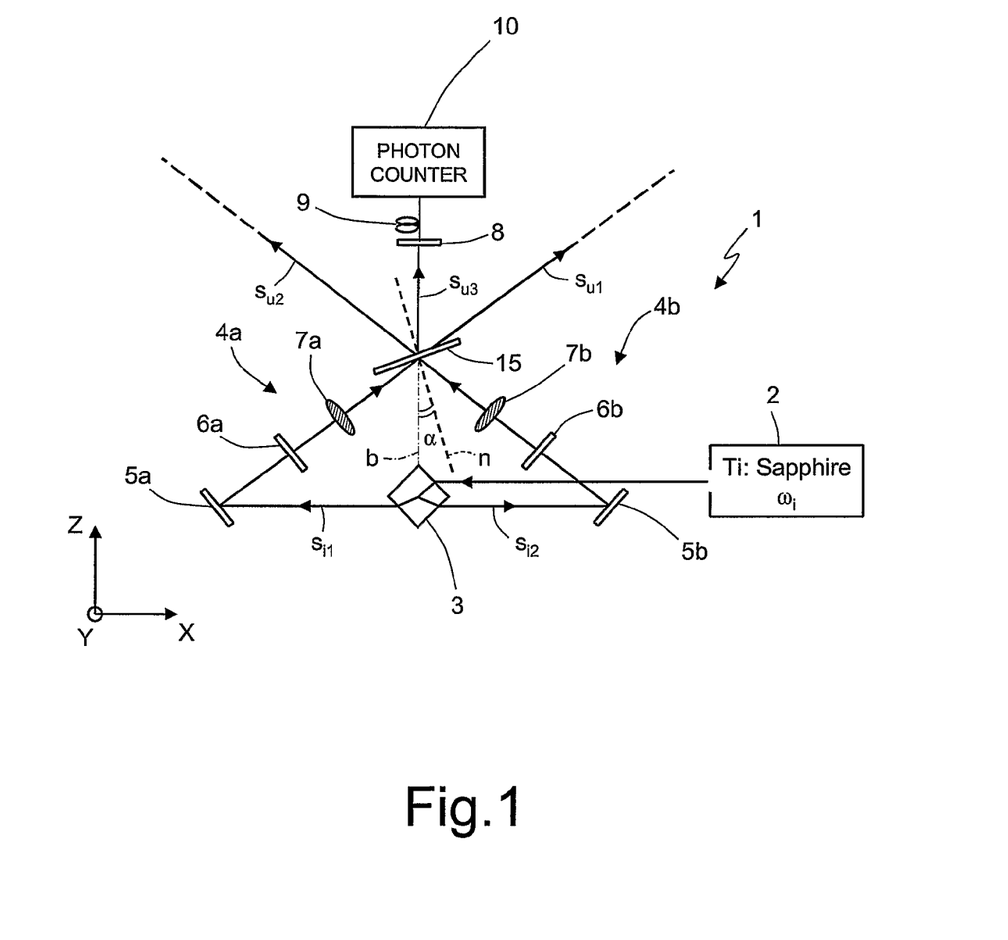
FIG. 1 shows a schematic representation of an optical logic gate embodied according to the principles of the present invention.

As shown in FIG. 1, this optical logic gate 1 comprises:

an optical source 2, adapted to generate quasi-monochromatic electromagnetic radiation with angular frequency $\omega_i$, a beam splitter 3, having a shape and arrangement with respect to the optical source 2 such that it is adapted to receive the quasi-monochromatic electromagnetic radiation in input and consequently generate a first and a second optical pump signal $s_{i1}$ and $s_{i2}$ in output having angular frequency $\omega_i$, directing them to a first and a second optical path 4a and 4b respectively, a first and a second reflective surface 5a and 5b, respectively arranged along the first and the second optical paths 4a and 4b, so as to receive the optical pump signals $s_{i1}$ and $s_{i2}$ generated by the beam splitter 3, a first and a second polarizing plate 6a and 6b of the half-wave type, respectively arranged along the first and second optical paths 4a and 4b, downstream of the reflective surfaces 5a and 5b, so as to receive the optical pump signals $s_{i1}$ and $s_{i2}$ reflected by the reflective surfaces 5a and 5b, a first and a second focusing lens 7a and 7b, respectively arranged along the first and the second optical paths 4a and 4b, downstream of the polarizing plates 6a and 6b, so as to receive the optical pump signals $s_{i1}$ and $s_{i2}$ from the polarizing plates 6a and 6b, a second-harmonic generator element 15, adapted to receive the optical pump signals $s_{i1}$ and $s_{i2}$ focused by the focusing lenses 6a and 6b, and generate a second-harmonic optical signal $s_{u3}$ having an angular frequency of $2\omega_i$, as described in detail in the following, when it is struck by the first and the second optical pump signal $s_{i1}$ and $s_{i2}$, and actuator means (not shown) for changing the position of the second-harmonic generator element 15.

FIG. 1 also shows a focusing device 8 and an optical fibre 9 of the single-mode type, arranged with respect to the second-harmonic generator element 15 such that the focusing device 8 focuses the second-harmonic optical signal $s_{u3}$ on the optical fibre 9, and a photon counting detector 10 coupled to the optical fibre 9, possibly via optical filters (not shown). Operatively, the focusing device 8, optical fibre 9 and photon counting detector 10 serve to monitor the operation of the optical logic gate 1, and in particular to analyse the second-harmonic optical signal $s_{u3}$.

The optical source 2 comprises a mode locked titanium-sapphire laser, tuned to a wavelength $\lambda$ of 830 nm and operated to generate pulses with an amplitude of 130 fs and a repetition rate of 76 MHz for these pulses. The electromagnetic radiation thus generated is then divided by the beam splitter 3 such that the above-mentioned first and second optical pump signals $s_{i1}$ and $s_{i2}$ have substantially the same intensity.

The function of the half-wave polarizing plates 6a and 6b is to allow polarization control of the above-mentioned optical signals s1 and s2, so that they strike the second-harmonic generator element 15 with preset polarizations, in detail with preset linear polarizations. These half-wave polarizing plates 6a and 6b are made so as to avoid introducing nonlinearity.

Figure 2:
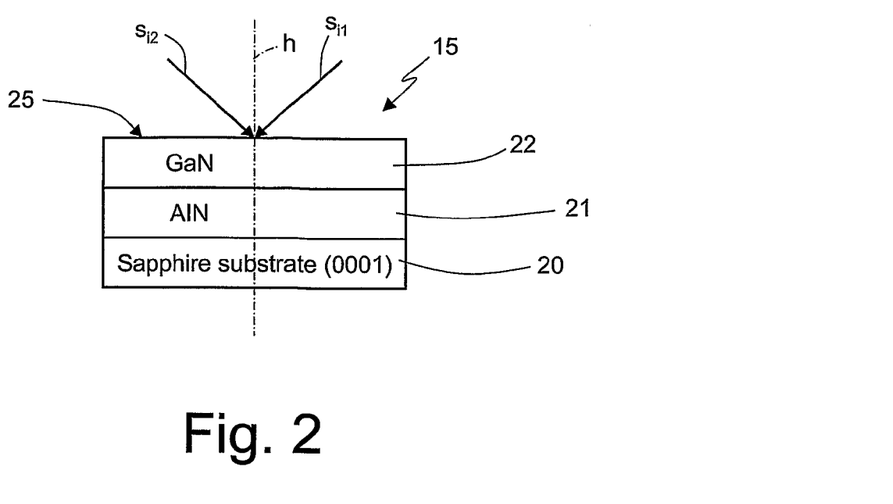
FIG. 2 shows a longitudinal section of a second-harmonic generator element.

With regard to the second-harmonic generator element 15, a section of which is schematically shown in FIG. 2, this has a substantially parallelepipedal shape and comprises a sapphire substrate ($Al_2O_3$) 20, an intermediate layer 21 of aluminium nitride (AlN) placed on top of the sapphire substrate 20 and a second-harmonic generator layer 22 (SHG layer) of gallium nitride (GaN) placed on top of the intermediate layer 21 of AlN. The above-specified layers 20, 21 and 22 are flat and have constant thickness and mutually parallel contact planes, in this way forming a layered stack structure. In detail, the sapphire substrate 20 is oriented so that the intermediate layer 21 is placed on top of the plane c (0001) of the sapphire substrate 20; furthermore, the intermediate layer 21 has a thickness of 76 nm, while the second-harmonic generator layer 22 has a thickness of 302 nm. In addition, reference numeral 25 in FIG. 2 indicates a flat incidence surface delimiting a face of the second-harmonic generator layer 22, upon which the optical pump signals s1 and s2 strike.

The second-harmonic generator layer 22 is made of single-crystal GaN, which has a wurtzite-type crystalline structure with a non-centrosymmetric hexagonal unit cell, with 6 mm point group symmetry. Furthermore, the single-crystal GaN is anisotropic and presents a second-order susceptibility tensor having elements $\chi_{113}^{(2)}$, $\chi_{131}^{(2)}$, $\chi_{223}^{(2)}$, $\chi_{232}^{(2)}$, $\chi_{311}^{(2)}$, $\chi_{322}^{(2)}$ and $\chi_{333}^{(2)}$ as the only non-null elements. Moreover, the relations $\chi_{311}^{(2)} = \chi_{322}^{(2)}$ and $\chi_{113}^{(2)} = \chi_{131}^{(2)} = \chi_{223}^{(2)} = \chi_{232}^{(2)}$ are valid, with a further reduction to just three non-null elements in frequency ranges for which it is possible to ignore absorption and apply the Kleinmann symmetry rules. In fact, employing the contracted notation, the non-null elements are $\chi_{31}^{(2)}$, $\chi_{15}^{(2)}$ and $\chi_{33}^{(2)}$; consequently, the second-order nonlinear optical tensor of the single-crystal GaN has the form:

$$\tilde{d} = \begin{pmatrix} 0 & 0 & 0 & 0 & d_{15} & 0 \\ 0 & 0 & 0 & d_{15} & 0 & 0 \\ d_{31} & d_{31} & d_{33} & 0 & 0 & 0 \end{pmatrix} \quad (1)$$

obtained by using the main axes of the single-crystal GaN as the base and remembering the relation that binds the second-order susceptibilities $\tilde{\chi}_{ijk}^{(2)}$ to the elements of the second-order nonlinear optical tensor:

$$\tilde{d}_{ijk} = \frac{1}{2}\tilde{\chi}_{ijk}^{(2)} \quad (2)$$

From an optical viewpoint, the second-harmonic generator layer 22 has a main optical axis h arranged perpendicularly to the second-harmonic generator layer 22, to the intermediate layer 21 and to the sapphire substrate 20, as schematically shown in FIG. 2.

The optical source 2, beam splitter 3, reflective surfaces 5a and 5b, half-wave polarizing plates 6a and 6b, focusing lenses 7a and 7b and the second-harmonic generator element 15 are arranged such that the optical paths 4a and 4b (hence, the optical pump signals $s_{i1}$ and $s_{i2}$) are coplanar and strike the second-harmonic generator layer 22 of the second-harmonic generator element 15.

Figure 3:
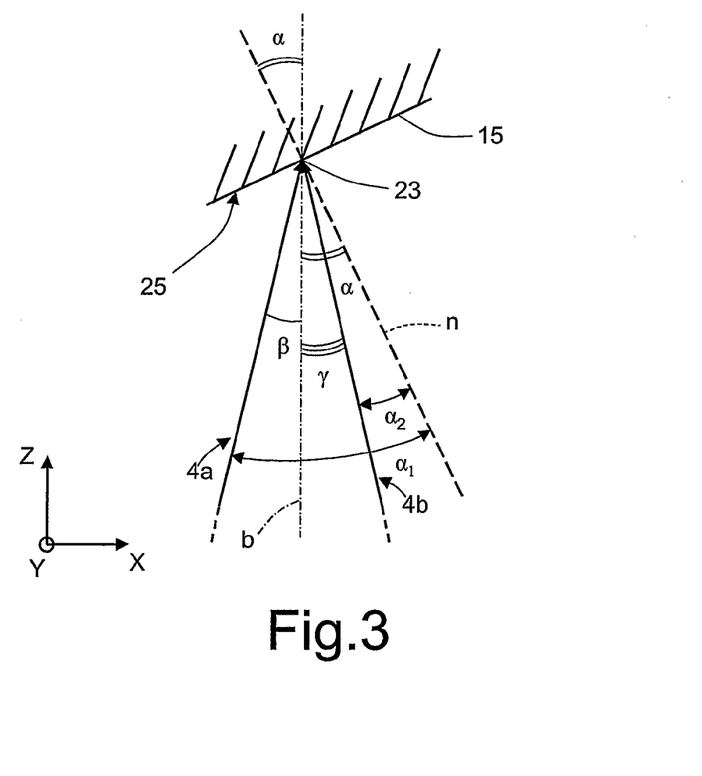
FIG. 3 shows a detail of the optical logic gate.

As shown in detail in FIG. 3, the optical paths 4a and 4b substantially strike at the same focus point 23, situated on the incidence surface 25 of the second-harmonic generator layer 22, and form between them a mutual angle of incidence of 18 degrees. In even greater detail, given the bisector b of the mutual angle of incidence, the optical paths 4a and 4b respectively form the angles $\beta$ and $\gamma$ with this bisector b, equal to +9 and −9 degrees. In addition, the bisector b forms an angle of inclination $\alpha$ with a normal n to the incidence surface 25 passing through the focus point 23. This angle of inclination $\alpha$ indicates the inclination of the second-harmonic generator element 15 with respect to the direction identified by the bisector b and can be varied by operating the actuator means and changing the position of the second-harmonic generator element 15. Lastly, it can be noted how the direction of the bisector b has been assumed, without loss of generality, as the longitudinal axis z of a first reference system used in the description of the optical logic gate 1.

Given the inclination of the second-harmonic generator element 15 with respect to the bisector b, the optical paths 4a and 4b (hence, the optical pump signals $s_{i1}$ and $s_{i2}$) strike the incidence surface 25 forming angles of incidence with the normal n of $\alpha_1$ and $\alpha_2$, equal to $\alpha+\beta$, and $\alpha+\gamma$ respectively. It should also be noted that the normal n is parallel to the main optical axis h.

After having struck the incidence surface 25 of the second-harmonic generator layer 22, the optical pump signals $s_{i1}$ and $s_{i2}$ are refracted and therefore propagate inside the second-harmonic generator element 15, passing through the second-harmonic generator layer 22, the intermediate layer 21 and the sapphire substrate 20 in succession.

The interaction of the optical signals $s_{i1}$ and $s_{i2}$ with the second-harmonic generator layer 22 induces a nonlinear polarization of the GaN, this polarization having harmonic components with angular frequencies of $2\omega_i$ and, by means of the second-order optical susceptibility $\chi_{ijk}^{(2)}(-2\omega_1, \omega_i, \omega_i)$, amplitudes proportional to the amplitudes of the optical signals $s_{i1}$ and $s_{i2}$. Furthermore, multiple reflections occur inside the second-harmonic generator element 15, with consequent amplification of the second-harmonic optical signal $s_{u3}$. This results in the output of the second-harmonic generator element 15 having three linearly polarized second-harmonic optical signals $s_{u1}$, $s_{u2}$ and $s_{u3}$ with respective angular frequencies $\omega_{u1}$, $\omega_{u2}$ and $\omega_{u3}$, all equal to $2\omega_i$.

The second-harmonic optical signals $s_{u1}$ and $s_{u2}$ have respective wave vectors $\vec{K}_{u1}$ and $\vec{K}_{u2}$, these having directions that are respectively collinear with the directions of the wave vectors of the optical pump signals $s_{i1}$ and $s_{i2}$ in input to the second-harmonic generator element 15. Instead, the second-harmonic optical signal $s_{u3}$ has a wave vector $\vec{K}_{u3}$ heading along the bisector b, independently of the angle of inclination $\alpha$; in fact, the wave vector conservation law must be respected, and so the relation $\vec{K}_{u1} + \vec{K}_{u2} = \vec{K}_{u3}$ must hold. On account of the assumed reference system, the second-harmonic optical signal $s_{u3}$ is found to head along the longitudinal axis z.

As described in greater detail further on, the described interaction depends on the angles of incidence $\alpha_1$ and $\alpha_2$ and on the polarization of the optical signals involved, both pump and second-harmonic ones. In particular, it is possible to change the polarization of the second-harmonic optical signal $s_{u3}$ by acting on the polarization of the optical pump signals $s_{i1}$ and $s_{i2}$.

The polarizing plates 6a and 6b determine the polarizations of the optical pump signals $s_{i1}$ and $s_{i2}$ that strike the incidence surface 25 of the second-harmonic generator element 15; in particular, these polarizations are linear. In consequence, the second-harmonic optical signal $s_{u3}$ is also found to have linear polarization.

As they are linearly polarized, each of the above-mentioned optical signals, both pump $s_{i1}$ and $s_{i2}$ and second-harmonic $s_{u3}$, can be broken down into two components having mutually orthogonal linear polarizations (i.e. having mutually orthogonal directions of polarization), which are referred to in the following as the P component and the S component. In particular, and with reference to FIG. 1, the P component of each of the above-mentioned optical signals is the orthogonal component whose electrical field lies on the xz plane, while the S component is the orthogonal component whose electrical field lies on the xy plane. In the following, the P components of the optical pump signals $s_{i1}$ and $s_{i2}$ and the second-harmonic optical signal $s_{u3}$ are respectively referred to as components $Ps_{i1}$, $Ps_{i2}$ and $Ps_{u3}$; similarly, the corresponding S components are respectively referred to as components $Ss_{i1}$, $Ss_{i2}$ and $Ss_{u3}$. In addition, references in the following to P or S polarized optical signals are intended as the optical signals comprising just the P or S component.

The P or S polarization of the optical pump signals $s_{i1}$ and $s_{i2}$ incident on the second-harmonic generator element 15 is selected by acting (in a known manner) on the polarizing plates 6a and 6b, such that the following situations are alternatively provided:
 first optical pump signal $s_{i1}$ with P polarization and second optical pump signal $s_{i2}$ with P polarization,
 first optical pump signal $s_{i1}$ with S polarization and second optical pump signal $s_{i2}$ with S polarization,
 first optical pump signal $s_{i1}$ with S polarization and second optical pump signal $s_{i2}$ with P polarization, and
 first optical pump signal $s_{i1}$ with P polarization and second optical pump signal $s_{i2}$ with S polarization.

That having been said, it is possible to demonstrate that the powers $W_{u3}^P$ and $W_{u3}^S$ of components $Ps_{u3}$ and $Ss_{u3}$ of the second-harmonic optical signal $s_{u3}$ are given by the equation:

$$W_{u3}^{P,S}(a) = \left(\frac{512 p^3}{A}\right) \cdot (t_{i1})^2 \cdot (t_{i2})^2 \cdot T_{2\omega_i} \cdot W_{i1} \cdot W_{i2} \frac{\sin^2(\Psi_{SHG}(a))}{[n_{\omega_i}^2 - n_{2\omega_i}^2]^2} (d_{\mathit{eff}}(\alpha))^2 \quad (3)$$

where A is a transverse area defined by the intersection of the optical pump signals $s_{i1}$ and $s_{i2}$ (or rather, of the corresponding Gaussian beams) with the incidence surface 25, $W_{i1}$ and $W_{i2}$ are the powers, equal in a first approximation, of the optical pump signals $s_{i1}$ and $s_{i21}$, $t_{i1}$ and $t_{i2}$ are the Fresnel transmission coefficients for the optical pump signals $s_{i1}$ and $s_{i21}$ at the air-second-harmonic generator layer 22 interface, $T_{2\omega_i}$ is the Fresnel transmission coefficient for the second-harmonic optical signal $s_{u3}$ in output from the second-harmonic generator element 15, i.e. at the sapphire substrate
 air interface, $n_{\omega_i}$ and $n_{2\omega_i}$ are the respective indexes of refraction of the GaN at the angular frequencies $\omega_i$ and $2\omega_i$, $d_{\mathit{eff}}(\alpha)$ is an effective nonlinear optical coefficient, described in detail further on, and $\psi_{SHG}(\alpha)$ is a phase factor, also described in detail further on. It should be noted that the Fresnel transmission coefficients $t_{i1}$, $t_{i2}$ and $T_{2\omega_i}$ of the optical pump signals $s_{i1}$ and $s_{i21}$ and the second-harmonic optical signal $s_{u3}$ depend on the angles of incidence $\alpha_1$ and $\alpha_2$ and the polarizations of the optical pump signals $s_{i1}$ and $s_{i2}$. The phase factor $\psi_{SHG}(\alpha)$ is given by the equation:

$$\Psi_{SHG} = \left(\frac{\pi L}{2}\right)\left(\frac{2}{\lambda}\right)[n_{\omega_i} \cdot \cos(\alpha_{r1}) + n_{\omega_i} \cdot \cos(\alpha_{r2}) - 2n_{2\omega_i} \cdot \cos(\alpha_{r3})] \quad (4)$$

where L is the thickness of the second-harmonic generator layer 22, $\lambda$ is the wavelength in a, vacuum, $\alpha_{r1}$ and $\alpha_{r2}$ are the angles of refraction of the optical pump signals $s_{i1}$ and $s_{i2}$ at the interface between the GaN and the air, which can be obtained via the Snell laws starting from the angles of incidence $\alpha_1$ and $\alpha_2$, and $\alpha_{r3}$ is the angle formed by the second-harmonic optical signal $s_{u3}$ with the normal n.

The effective nonlinear optical coefficient $d_{\mathit{eff}}(\alpha)$ depends on the components of the nonlinear, second-order dielectric susceptibility tensor of the GaN (via the relation $$\tilde{d}_{ljk} = \frac{1}{2}\tilde{\chi}_{ljk}^{(2)}$$

and the angle of inclination $\alpha$, as well as depending on;
 the component ($Ps_{u3}$ or $Ss_{u3}$) of the second-harmonic optical signal $s_{u3}$ under consideration, and
 the polarizations of the optical pump signals $s_{i1}$ and $s_{i2}$,
There are therefore eight possible values provided for the effective nonlinear optical coefficient $d_{\mathit{eff}}(\alpha)$. In detail, it is possible to demonstrate that the effective nonlinear optical coefficient $d_{\mathit{eff}}(\alpha)$ assumes the following expressions:

$$d_{\mathit{eff}}^{ppP} = \quad (5)$$
$$-\sin(\alpha)(d_{31}\cos(\alpha+\beta)\cos(\alpha+\gamma) + d_{33}\sin(\alpha+\beta)\sin(\alpha+\gamma)) + \cos(\alpha)$$
$$d_{15}\sqrt{2}\left(-\frac{\sqrt{2}}{2}\cos(\alpha+\beta)\sin(\alpha+\gamma) - \frac{\sqrt{2}}{2}\cos(\alpha+\gamma)\sin(\alpha+\beta)\right)$$

$$d_{\mathit{eff}}^{ssP} = -\sin(\alpha)d_{31}$$

-continued $$d_{eff}^{psS} = -d_{15}\sin(\alpha + \beta)$$

$$d_{eff}^{spS} = -d_{15}\sin(\alpha + \gamma)$$

$$d_{eff}^{psP} = d_{eff}^{spP} = d_{eff}^{ppS} = d_{eff}^{ssS} = 0$$

In the equations 5, $d_{eff}^{ppP}$ represents the value of the effective nonlinear optical coefficient in the case of P-polarized optical pump signals $s_{i1}$, $s_{i2}$ and second-harmonic optical signal $s_{u3}$; $d_{eff}^{ssP}$ represents the value of the effective nonlinear optical coefficient in the case of S-polarized optical pump signals $s_{i1}$, $s_{i2}$ and P-polarized second-harmonic optical signal $s_{u3}$; $d_{eff}^{ppS}$ represents the value of the effective nonlinear optical coefficient in the case of P-polarized first optical pump signal $s_{i1}$ and S-polarized second optical pump signal $s_{i2}$ and second-harmonic optical signal $s_{u3}$; and $d_{eff}^{spS}$ represents the value of the effective nonlinear optical coefficient in the case of P-polarized second optical pump signal $s_{i2}$ and S-polarized first optical pump signal $s_{i1}$ and second-harmonic optical signal $s_{u3}$. Instead, the values assumed by the effective nonlinear optical coefficient in the case of optical pump signals $s_{i1}$ and $s_{i2}$ with orthogonal polarizations and P-polarized second-harmonic optical signal $s_{u3}$ ($d_{eff}^{psP}$, $d_{eff}^{spP}$), and in the case of optical pump signals $s_{i1}$ and $s_{i2}$ with parallel polarizations and S-polarized second-harmonic optical signal $s_{u3}$ ($d_{eff}^{ppS}$, $d_{eff}^{ssS}$), are null.

Figure 4A:
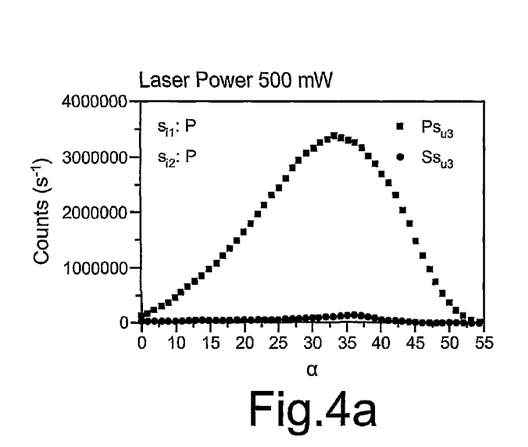
FIGS. 4a-4d show the power trends of orthogonal components of a second-harmonic optical signal against angle of inclination.
Figure 4B:
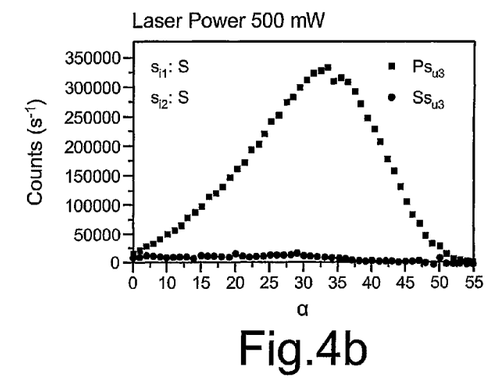
Figure 4C:
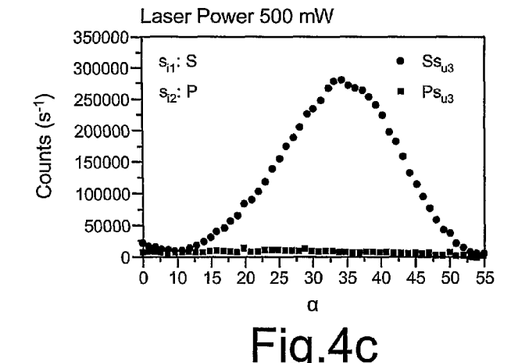
Figure 4D:
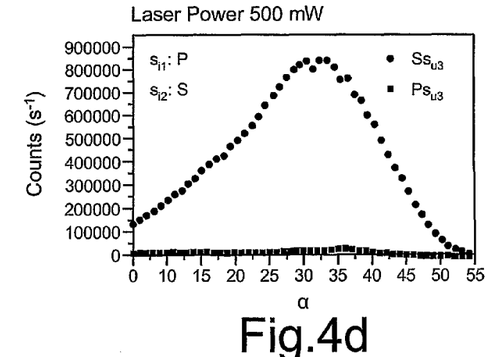

An indicative analysis of the operation of the described optical logic gate 1 is provided in FIGS. 4a-4d, in which the power trends (number of photons per second) are shown for the $Ps_{u3}$ component (small-squares line) and the $Ss_{u3}$ component (round-dots line) of the second-harmonic optical signal $s_{u3}$ as the angle of inclination α (expressed in degrees) varies, in the respective cases of:

P-polarized first and second optical pump signal $s_{i1}$ and $s_{i2}$ (FIG. 4a), S-polarized first and second optical pump signal $s_{i1}$ and $s_{i2}$ (FIG. 4b), S-polarized first optical pump signal $s_{i1}$ and P-polarized second optical pump signal $s_{i2}$ (FIG. 4c), and P-polarized first optical pump signal $s_{i1}$ and S-polarized second optical pump signal $s_{i2}$ (FIG. 4d).

As shown in FIGS. 4a-4d, in the cases described, the second-harmonic optical signal $s_{u3}$ has a dominant component, for which it is substantially P or S polarized, depending on the case in hand; the presence of this dominant component is particularly evident for angles of inclination a between 20 and 45 degrees, especially for angles of inclination α close to 35 degrees.

In detail, in the case where the optical pump signals $s_{i1}$ and $s_{i2}$ are polarized in the same manner (both type P or type S), the second-harmonic optical signal $s_{u3}$ is substantially P-polarized, independently of the fact that the optical pump signals $s_{i1}$ and $s_{i2}$ are P or S polarized. Vice versa, in the case where the optical pump signals $s_{i1}$ and $s_{i2}$ are polarized in a different manner, therefore the case where one of them is P-polarized and the other is S-polarized, the second-harmonic optical signal $s_{u3}$ is substantially S-polarized.

The polarizations of the above-mentioned optical pump signals $s_{i1}$ and $s_{i2}$ are electrical characteristics that, by construction, i.e. by opportunely acting on the polarizing plates 6a and 6b, can assume only two values over time (P or S polarization); correspondingly, the polarizations of the allows a logic operation to be implemented using optical signals, with consequent rapidity of switching, absence of consumption and the possibility of integrating the optical logic gate itself in complex optical circuits, implementing complex logic functions.

Finally, it is clear that modifications and variants can be made to the described optical logic gate without leaving the scope of the present invention, as defined by the enclosed claims.

For example, instead of GaN, it is possible to use any material that has a crystalline structure similar to that of wurtzite, with 6 mm point group symmetry, non-centrosymmetric and hexagonal unit cell, as the material of the second-harmonic generator layer 22, such as cadmium selenide (CdSe), zinc oxide (ZnO), wurtzite zinc sulphide (α-ZnS), or wurtzite silicon carbide (α-SiC). Furthermore, although its presence allows a GaN layer to be grown with less lattice imperfections, the intermediate layer 21 of AlN is optional. In place of the half-wave polarizing plates, it is possible to use other polarization control means, such as dichroic filters for example.

With regard to the optical pump signals $s_{i1}$ and $s_{i2}$, they can have mutually different angular frequencies, for example, equal to $\omega_1$ and $\omega_2$, the second-harmonic optical signal $s_{u3}$ consequently having an angular frequency of $\omega_1+\omega_2$. In this case, equations 3 and 4 are respectively generalised as follows:

$$W_{u3}^{P,S}(\alpha) = \left(\frac{512\pi^3}{A}\right)(t_{i1})^2 \cdot (t_{i2})^2 \cdot T_{\omega_1+\omega_2} \cdot W_{i1} \cdot W_{i2} \quad (6)$$

$$\frac{\sin^2\Psi(\Psi_{SHG}(\alpha))}{[n_{\omega_1} \cdot n_{\omega_2} - n_{\omega_1+\omega_2}^2]^2}(d_{eff}(\alpha))^2$$

$$\Psi_{SHG} = \left(\frac{\pi L}{2}\right)\left(\frac{2}{\lambda}\right)[n_{\omega_1} \cdot \cos(\alpha_{r1}) + n_{\omega_2} \cdot \cos(\alpha_{r2}) - 2n_{\omega_1+\omega_2} \cdot \cos(\alpha_{r3})] \quad (7)$$

where A is the previously defined transverse area, $W_{i1}$ and $W_{i2}$ are the powers of the optical pump signals $s_{i1}$ and $s_{i21}$, $t_{i1}$ and $t_{i2}$ are the Fresnel transmission coefficients for the optical pump signals $s_{i1}$ and $s_{i2}$ at the air-second-harmonic generator layer 22 interface, $T_{\omega_1+\omega_2}$ is the Fresnel transmission coefficient for the second-harmonic optical signal $s_{u3}$ in output from the second-harmonic generator element 15, namely at the sapphire substrate—air interface, $n_{\omega_1}$, $n_{\omega_2}$ and $n_{\omega_1+\omega_2}$ are the respective indexes of refraction of GaN at the angular frequencies $\omega_1$, $\omega_2$ and $\omega_1+\omega_2$, and $d_{eff}(\alpha)$ is the effective susceptibility. In addition, L is the thickness of the second-harmonic generator layer 22, λ è is the wavelength in a vacuum, $\alpha_{r1}$ and $\alpha_{r2}$ are the angles of refraction of the optical pump signals $s_{i1}$ and $s_{i2}$ at the interface between GaN and the air, and $\alpha_{r3}$ is the angle formed by the second-harmonic optical signal $s_{u2}$ with the normal n.

It should be noted that, in the case of optical pump signals $s_{i1}$ and $s_{i2}$ with different angular frequencies, the second-harmonic optical signal $s_{u3}$ is no longer collinear with the bisector b. It should also be noted that the above-mentioned optical pump signals $s_{i1}$ and $s_{i2}$ can be nonlinearly polarized.

To allow compensation of possible differences in length of the optical paths 4a and 4b, it is possible to use at least one delay line of known type, inserted in one of the optical paths 4a and 4b such that the optical pump signals $s_{i1}$ and $s_{i2}$ strike the second-harmonic generator element 15 at the same instants in time. Furthermore, it is possible to use a light source 2 of a different type from that described, for example, an optical source of the non-pulsed type or with a different wavelength.

The invention claimed is:

1. An optical logic gate (1) comprising a generator element (15) configured to receive a first and a second optical input signal ($s_{i1}, s_{i2}$) respectively having a first and a second angular frequency ($\omega_1, \omega_2$) and respectively having a first and a second polarization (P;S), and to provide a sum optical signal ($s_{u3}$) having a third angular frequency ($2\omega_i, \omega_1+\omega_2$) and a third polarization (P;S), said third angular frequency ($2\omega_i, \omega_1+\omega_2$) being equal to the sum of said first and second angular frequency ($\omega_1, \omega_2$), said third polarization being a function of said first and second polarizations, said generator element (15) comprising a generator layer (22) in a material having a non-null second-order optical tensor; characterized in that logic states are associated to said first, second and third polarizations.

2. The optical logic gate (1) according to claim 1, in which said material also has a crystalline structure with non-centrosymmetric hexagonal unit cells and 6 mm point group symmetry.

3. The optical logic gate (1) according to claim 1, also comprising means of polarization control (6a,6b) configured to control the polarizations of said first and second optical input signal ($s_{i1}, s_{i2}$) such that said first and second optical input signal ($s_{i1}, s_{i2}$) strike said generator element (15), respectively having polarizations belonging to a binary set ([P,S]) of possible polarizations as the first and second polarization (P;S), in a manner such that said third polarization (P;S) also belongs to said binary set of possible polarizations.

4. The optical logic gate (1) according to claim 3, in which said binary set ([P,S]) of possible polarizations comprises two linear polarizations (P,S), respectively directed along a first and a second direction of polarization that are mutually orthogonal.

5. The optical logic gate (1) according to claim 4, in which said means of polarization control (6a,6b) comprises a first and a second half-wave polarizing plate.

6. The optical logic gate (1) according to claim 4, also comprising means of focusing (7a,7b) configured to focus said first and second optical input signal ($s_{i1}, s_{i2}$) substantially on a same focus point (23) of said generator element (15).

7. The optical logic gate (1) according to claim 6, in which said means of polarization control (6a,6b), said means of focusing (7a,7b) and said generator element (15) are configured such that said first and second optical input signal ($s_{i1}, s_{i2}$) have directions of propagation lying in a same plane (xz) and forming a first angle, said generator layer (22) having an optical axis lying in said plane (xz) and forming a second angle ($\alpha$) with a bisector of said first angle, said first and second direction of polarization being respectively parallel and perpendicular to said plane (xz).

8. The optical logic gate (1) according to claim 7, in which said material of said generator layer (22) is gallium nitride (GaN).

9. The optical logic gate (1) according to claim 8, in which said second angle ($\alpha$) belongs to a range including 35 degrees.

10. The optical logic gate (1) according to claim 9, in which said generator element (15) also comprises an intermediate layer (21) of aluminium nitride (AlN) and a sapphire substrate (20), said generator layer (22) being placed on top of said intermediate layer (21), said intermediate layer (21) being placed on top of a plane c (0001) of said sapphire substrate (20).

11. The optical logic gate (1) according to claim 1, in which said material of said generator layer (22) is a material chosen from: cadmium selenide (CdSe), zinc oxide (ZnO), wurtzite zinc sulphide ($\alpha$-ZnS) and wurtzite silicon carbide ($\alpha$-SiC).

12. The optical logic gate (1) according to claim 1, also comprising a beam splitter (3) configured to receive electromagnetic radiation having a preset angular frequency ($\omega_i$) and generate said first ($s_{i1}$) and second optical input signal ($s_{i1}, s_{i2}$), said first angular frequency ($\omega_1$) and said second angular frequency ($\omega_2$) being equal to said preset angular frequency ($\omega_i$), and said third angular frequency being equal to twice said preset angular frequency ($\omega_i$).

13. The optical logic gate (1) according to claim 12, also comprising a first and a second reflective surface (5a,5b) configured to respectively direct said first and second optical input signal ($s_{i1}, s_{i2}$) generated by said beam splitter (3) towards said generator element (15).

14. The optical logic gate (1) according to claim 13, also comprising an optical source (2) configured to generate said electromagnetic radiation having said preset angular frequency ($\omega_i$).

15. A method for implementing a logic gate, comprising the steps of:
a) providing an optical logic gate (1) comprising a generator element (15) configured to receive a first and a second optical input signal ($s_{i1}, s_{i2}$) respectively having a first and a second angular frequency ($\omega_1, f_2$) and respectively having a first and a second polarization (P;S), and to provide a sum optical signal ($s_{u3}$) having a third angular frequency ($2\omega_i, \omega_1+\omega_2$) and a third polarization (P;S), said third angular frequency ($2\omega_i, \omega_1+\omega_2$) being equal to the sum of said first and second angular frequency ($\omega_1 \omega_2$), said third polarization being a function of said first and second polarizations, said generator element (15) comprising a generator layer (22) in a material having a non-null second-order optical tensor,
b) generating and directing said first and second optical input signal ($s_{i1}, s_{i2}$) towards said generator element (15), and
c) respectively associating a first, second and third logic state ("0" or "1") to said first, second and third polarization (P or S).

16. The method for implementing a logic gate according to claim 15, wherein said optical logic gate (1) further comprises means of polarization control (6a,6b) configured to control the polarizations of said first and second optical input signal ($s_{i1}, s_{i2}$) such that said first and second optical input signal ($s_{i1}, s_{i2}$) strike said generator element (15) respective having polarizations belonging to a binary set ([P,S]) of possible polarizations as the first and second polarization (P;S), in a manner such that said third polarization (P;S) also belongs to said binary set of possible polarizations said binary set ([P,S]) of possible polarizations comprising two linear polarizations (P,S), respectively directed along a first and a second direction of polarization that are mutually orthogonal; and wherein said optical logic gate further comprises means of focusing (7a, 7b) configured to focus said first and second optical input signal ($s_{i1}, s_{i2}$) substantially on a same focus point (23) of said generator element (15); and wherein said means of polarization control (6a,6b), said means of focusing (7a,7b) and said generator element (15) are configured such that said first and second optical input signal ($s_{i1}, s_{i2}$) have directions of propagation lying in a same plane (xz) and forming a first angle, said generator layer (22) having an optical axis lying in said plane (xz) and forming a second angle ($\alpha$) with a bisector of said first angle, said first and second direction of polarization being respectively parallel and perpendicular to said plane (xz);
and in which said step c) of associating comprises associating either the logic state "0", if the direction of the corresponding polarization is parallel to said plane (xz), or the logic state "1", if the direction of the corresponding polarization is perpendicular to said plane (xz), as the first, second and third logic state, in a manner such that said logic gate is of the EXOR type.

17. The method for implementing a logic gate according to claim 15, wherein said optical logic gate (1) further comprises means of polarization control (6a,6b) configured to control the polarizations of said first and second optical input signal ($s_{i1}$,$s_{i2}$) such that said first and second optical input signal ($s_{i1}$,$s_{i2}$) strike said generator element (15), respectively having polarizations belonging to a binary set ([P,S]) of possible polarizations as the first and second polarization (P;S), in a manner such that said third polarization (P;S) also belongs to said binary set of possible polarizations, said binary set ([P,S]) of possible polarizations comprising two linear polarizations (P,S), respectively directed along a first and a second direction of polarization that are mutually orthogonal; and wherein said optical logic gate further comprises means of focusing (7a,7b) configured to focus said first and second optical input signal ($s_{i1}$, $s_{i2}$) substantially on a same focus point (23) of said generator element (15); and wherein said means of polarization control (6a,6b), said means of focusing (7a,7b) and said generator element (15) are configured such that said first and second optical input signal ($s_{i1}$,$s_{i2}$) have directions of propagation lying in a same plane (xz) and forming a first angle, said generator layer (22) having an optical axis lying in said plane (xz) and forming a second angle ($\alpha$) with a bisector of said first angle, said first and second direction of polarization being respectively parallel and perpendicular to said plane (xz);

and in which said step c) of associating comprises associating either the logic state "1", if the direction of the corresponding polarization is parallel to said plane (xz), or the logic state "0", if the direction of the corresponding polarization is perpendicular to said plane (xz), as the first, second and third logic state, in a manner such that said logic gate is of the EXNOR type.

\* \* \* \* \*

UNITED STATES PATENT AND TRADEMARK OFFICE
CERTIFICATE OF CORRECTION

PATENT NO. : 8,520,278 B2  Page 1 of 1
APPLICATION NO. : 13/131025
DATED : August 27, 2013
INVENTOR(S) : Bovino et al.

It is certified that error appears in the above-identified patent and that said Letters Patent is hereby corrected as shown below:

In the Claims

In Column 10, Line 23, in Claim 15, delete "$(\omega_1, \int_2)$" and insert -- $(\omega_1, \omega_2)$ --, therefor.

In Column 10, Line 29, in Claim 15, delete "$(\omega_1 \omega_2)$," and insert -- $(\omega_1, \omega_2)$, --, therefor.

In Column 10, Line 48, in Claim 16, delete "polarizations" and insert -- polarizations, --, therefor.

Signed and Sealed this
Twenty-fourth Day of February, 2015

Michelle K. Lee
*Deputy Director of the United States Patent and Trademark Office*